(12) United States Patent
Kurabayashi

(10) Patent No.: US 12,179,112 B2
(45) Date of Patent: Dec. 31, 2024

(54) CONTENT PLAYBACK PROGRAM AND CONTENT PLAYBACK DEVICE

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 269 days.

(21) Appl. No.: 18/057,978

(22) Filed: Nov. 22, 2022

(65) Prior Publication Data

US 2023/0080066 A1    Mar. 16, 2023

Related U.S. Application Data

(63) Continuation of application No. PCT/JP2021/019216, filed on May 20, 2021.

(30) Foreign Application Priority Data

May 22, 2020 (JP) .................................. 2020-089354

(51) Int. Cl.
 *A63F 13/60* (2014.01)
 *A63F 13/52* (2014.01)
 (Continued)

(52) U.S. Cl.
 CPC .............. *A63F 13/60* (2014.09); *A63F 13/52* (2014.09); *A63F 13/54* (2014.09); *G06F 3/14* (2013.01);
 (Continued)

(58) Field of Classification Search
 CPC .......... A63F 13/60; A63F 13/52; A63F 13/54; A63F 13/56; A63F 13/825; A63F 13/92;
 (Continued)

(56) References Cited

U.S. PATENT DOCUMENTS 8,396,580 B2 * 3/2013 Nishimura ........ H01L 21/67005
700/121
8,583,178 B2 * 11/2013 Yun ....................... G06F 1/1647
345/3.1
(Continued)

FOREIGN PATENT DOCUMENTS

CN    107251550 A    10/2017
CN    107261499 A    10/2017
(Continued)

OTHER PUBLICATIONS

International preliminary report on patentability, PCT/JP2019/109216, downloaded from wipo.int on Oct. 5, 2024.*

(Continued)

*Primary Examiner* — David L Lewis
*Assistant Examiner* — Matthew D Hoel
(74) *Attorney, Agent, or Firm* — Osha Bergman Watanabe & Burton LLP

(57) ABSTRACT

Provided are a content playback program and a content playback device in which a character displayed on a display unit takes a predetermined reaction in response to a screenshot acquisition operation. When execution of a screenshot caused by a user's operation is detected in a state in which a character is displayed on the display unit, a content playback processing unit executes a production in which a facial expression of the character changes and/or a production in which the character speaks, immediately after completion of the screenshot.

4 Claims, 11 Drawing Sheets

(51) Int. Cl.
*A63F 13/54* (2014.01)
*G06F 3/14* (2006.01)

(52) U.S. Cl.
CPC ............... *A63F 2300/6009* (2013.01); *A63F 2300/6081* (2013.01); *A63F 2300/66* (2013.01)

(58) Field of Classification Search
CPC ...... A63F 2300/6009; A63F 2300/6081; A63F 2300/66; G06F 3/147; G06F 3/14
See application file for complete search history.

(56) References Cited

U.S. PATENT DOCUMENTS

| | | | | |
|---|---|---|---|---|
| 9,682,323 | B2 | 6/2017 | Kenichi | |
| 9,889,376 | B2 | 2/2018 | Kenichi | |
| 10,063,731 | B2* | 8/2018 | Nakamura | H04N 1/00238 |
| 10,384,125 | B2 | 8/2019 | Kurabayashi | |
| 10,406,443 | B2 | 9/2019 | Kenichi | |
| 10,967,262 | B2 | 4/2021 | Kenichi | |
| 10,992,646 | B2* | 4/2021 | Zhou | H04L 63/04 |
| 2005/0267867 | A1* | 12/2005 | Wu | G06F 16/20 |
| 2010/0141661 | A1* | 6/2010 | Kojima | G09B 7/00 345/473 |
| 2010/0262864 | A1* | 10/2010 | Tsujido | G06F 11/3476 714/E11.178 |
| 2013/0090912 | A1* | 4/2013 | Lee | G06F 9/455 703/23 |
| 2014/0349753 | A1 | 11/2014 | Kenichi | |
| 2014/0364221 | A1 | 12/2014 | Kenichi | |
| 2015/0024842 | A1 | 1/2015 | Kenichi | |
| 2015/0172477 | A1* | 6/2015 | Yamamoto | H04N 1/32657 358/1.15 |
| 2015/0231505 | A1 | 8/2015 | Kenichi | |
| 2015/0294433 | A1 | 10/2015 | Ye | |
| 2017/0282071 | A1 | 10/2017 | Kurabayashi | |
| 2018/0178127 | A1* | 6/2018 | Okamura | A63F 13/35 |
| 2018/0197509 | A1* | 7/2018 | Kobayashi | G09G 5/02 |
| 2019/0344180 | A1 | 11/2019 | Kenichi | |
| 2022/0179608 | A1* | 6/2022 | Kawashima | G06F 3/14 |

FOREIGN PATENT DOCUMENTS

| | | |
|---|---|---|
| JP | 2017513106 A | 5/2017 |
| JP | 2018099362 A | 6/2018 |
| JP | 2018153655 A | 10/2018 |
| JP | 2019023846 A | 2/2019 |

OTHER PUBLICATIONS

Written opinion, PCT/JP2019/109216, downloaded from wipo.int on Oct. 5, 2024.*
International search report, PCT/JP2019/109216, downloaded from wipo.int on Oct. 5, 2024.*
Decision to Grant issued in Chinese Application No. 202180059018.7; Dated Jul. 31, 2023 (6 pages).
"Kingdom Hearts III", Weekly Famitsu) vol. 34, No. 6, pp. 92, 100, 112; in particular, p. 100, column "Take a picture and let's aim to complete the mission", p. 112, column "Let's take a commemorative photo with friends in each world" Jan. 25, 2019 (3 pages).
Nana's weblog [online] column "1: I want to take a close-up shot of the lake big beast", non-official translation (Trip of FF15-8 'I want to take a close-up shot of the beast of the lake' & walking at 'Cape Caem') Dec. 7, 2016 (8 pages).
Tomose-blog.com[online] entire text, non-official translation ("Collection of touch reaction for 'Shinymas' Home Part 1, want to live only by playing games"[online]) Jan. 14, 2020 (18 pages).
International Search Report issued in International Application No. PCT/JP2021/019216, mailed Jul. 20, 2021 (7 pages).
Written Opinion issued in International Application No. PCT/JP2021/019216; Dated Jul. 20, 2021 (3 pages).

* cited by examiner

401 CHARACTER MASTER

| CHARACTER ID | CHARACTER NAME |
|---|---|
| 0001 | TAROU |
| 0002 | JIROU |
| 0003 | SABUROU |
| 0004 | HANAKO |
| 0005 | KIRIKO |
| 0006 | TAMIKO |

403 EVENT TABLE

| EVENT TYPE | CONDITIONAL SCRIPT |
|---|---|
| GREETING FOR WEEKDAY MORNINGS | |
| GREETING FOR HOLIDAY MORNINGS | |
| BIRTHDAY | |
| SCREENSHOT | |

*FIG. 4*

404 SCENARIO TABLE

| CHARACTER ID | EVENT TYPE | DISPLAY SCRIPT |
|---|---|---|
| 0001 | GREETING FOR WEEKDAY MORNINGS | |
| 0001 | GREETING FOR HOLIDAY MORNINGS | |
| 0001 | BIRTHDAY | |
| 0001 | SCREENSHOT | |
| 0002 | GREETING FOR WEEKDAY MORNINGS | |
| 0002 | GREETING FOR HOLIDAY MORNINGS | |
| 0002 | BIRTHDAY | |
| 0002 | SCREENSHOT | |
| 0003 | GREETING FOR WEEKDAY MORNINGS | |

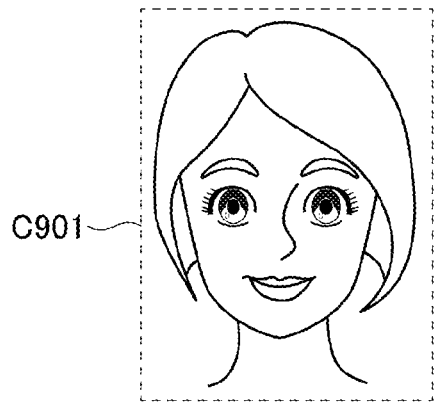
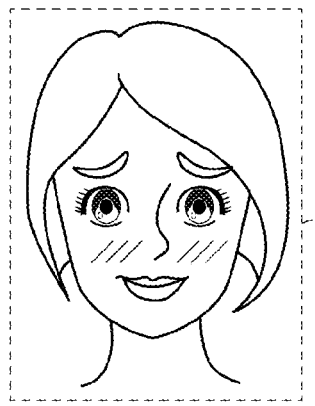
FIG. 9A          FIG. 9B
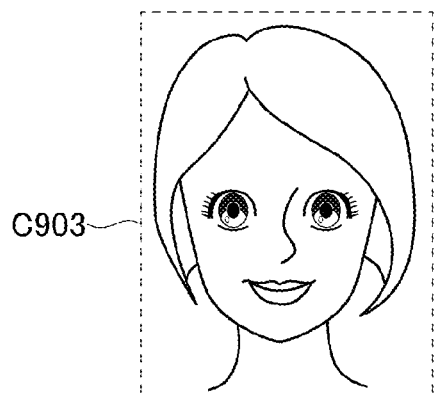
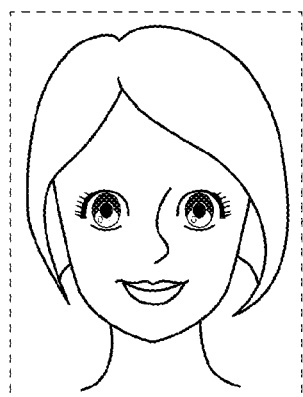
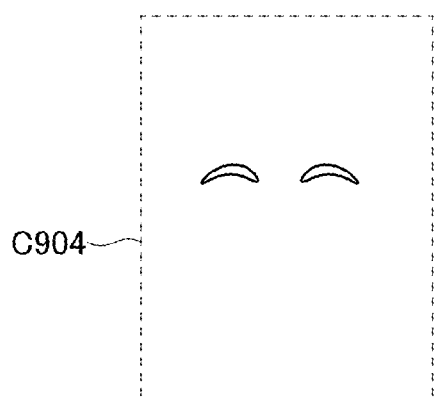
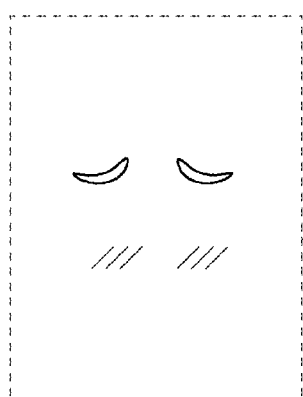
FIG. 9C          FIG. 9D

401 CHARACTER MASTER

| CHARACTER ID | CHARACTER NAME |
|---|---|
| 0001 | TAROU |
| 0002 | JIROU |
| 0003 | SABUROU |
| 0004 | HANAKO |
| 0005 | KIRIKO |
| 0006 | TAMIKO |

1002 CHARACTER STATUS TABLE

| CHARACTER ID | LEVEL |
|---|---|
| 0001 | 1 |
| 0002 | 2 |
| 0003 | 1 |
| 0004 | 1 |
| 0005 | 2 |
| 0006 | 2 |

403 EVENT TABLE

| EVENT TYPE | CONDITIONAL SCRIPT |
|---|---|
| GREETING FOR WEEKDAY MORNINGS | |
| GREETING FOR HOLIDAY MORNINGS | |
| BIRTHDAY | |
| SCREENSHOT | |

*FIG. 10*

404 SCENARIO TABLE

| CHARACTER ID | EVENT TYPE | DISPLAY SCRIPT |
|---|---|---|
| 0001 | GREETING FOR WEEKDAY MORNINGS | |
| 0001 | GREETING FOR HOLIDAY MORNINGS | |
| 0001 | BIRTHDAY | |
| 0001 | SCREENSHOT | |
| 0002 | GREETING FOR WEEKDAY MORNINGS | |
| 0002 | GREETING FOR HOLIDAY MORNINGS | |
| 0002 | BIRTHDAY | |
| 0002 | SCREENSHOT | |
| 0003 | GREETING FOR WEEKDAY MORNINGS | |

401 CHARACTER MASTER

| CHARACTER ID | CHARACTER NAME |
|---|---|
| 0001 | TAROU |
| 0002 | JIROU |
| 0003 | SABUROU |
| 0004 | HANAKO |
| 0005 | KIRIKO |
| 0006 | TAMIKO |

1002 CHARACTER STATUS TABLE

| CHARACTER ID | LEVEL |
|---|---|
| 0001 | 1 |
| 0002 | 2 |
| 0003 | 1 |
| 0004 | 1 |
| 0005 | 2 |
| 0006 | 2 |

1103 EVENT TABLE

| EVENT TYPE | CONDITIONAL SCRIPT |
|---|---|
| GREETING FOR WEEKDAY MORNINGS | |
| GREETING FOR HOLIDAY MORNINGS | |
| BIRTHDAYLv1 | |
| BIRTHDAYLv2 | |
| SCREENSHOTLv1 | |
| SCREENSHOTLv2 | |

*FIG. 11*

1104 SCENARIO TABLE

| CHARACTER ID | EVENT TYPE | DISPLAY SCRIPT |
|---|---|---|
| 0001 | GREETING FOR WEEKDAY MORNINGS | |
| 0001 | GREETING FOR HOLIDAY MORNINGS | |
| 0001 | BIRTHDAYLv1 | |
| 0001 | BIRTHDAYLv2 | |
| 0001 | SCREENSHOTLv1 | |
| 0001 | SCREENSHOTLv2 | |
| 0002 | GREETING FOR WEEKDAY MORNINGS | |
| 0002 | GREETING FOR HOLIDAY MORNINGS | |
| 0002 | BIRTHDAYLv1 | |
| 0002 | BIRTHDAYLv2 | |
| 0002 | SCREENSHOTLv1 | |
| 0002 | SCREENSHOTLv2 | |
| 0003 | GREETING FOR WEEKDAY MORNINGS | |

CONTENT PLAYBACK PROGRAM AND CONTENT PLAYBACK DEVICE

TECHNICAL FIELD

The present invention relates to a content playback program and a content playback device.

BACKGROUND ART

The applicant develops and distributes game programs and game services. In recent years, the demand for game programs or game services for smartphones has been increasing more than that for game programs for dedicated game machines.

In particular, many game service providers, including the applicant, provide online game services in which smartphones are connected through the Internet to game servers that provide game content and receive various items of game content via the game servers.

One aspect of games provided by such game service providers is a content playback service having a complex content playback function obtained by integrating not only an action game element, in which a game character (hereinafter, simply abbreviated to "character") is moved according to an operation by a user, but also a functional element, such as a novel game in which a story progresses when characters make a conversation, an animation video, and a web browser.

Various types of ingenuity are exercised in online game services in order to keep providing the services to many users for as long as possible. For example, rate-determining control is performed on the game progress such that the growth speed of characters in game content is intentionally slowed down. Furthermore, in such online game services, it is often the case that characters in game content are expressed in beautiful and cute illustrations, a story in which the characters are produced attractively is novelized or animated, or voices of popular voice actors are added to the characters, thus providing many attractive characters.

In particular, in order to evoke the users' feelings of strong favor etc. toward characters in games, which are factious persons, the characters are attractively produced through illustrations, lines spoken by popular voice actors, novelization, animation, or the like. In this way, the feelings of strong favor etc. toward characters in games are commonly called "character Moe".

Furthermore, one specific character toward which a user shows favor in particular is commonly called a "favorite character".

In particular, this concept of "favorite character" is an extremely important selling point in online game services, for determining how to attract many users. Furthermore, "favorite character" is also an extremely important concept in the present invention.

Patent Literature 1 discloses an amusement machine (slot machine) in which, when a player obtains valuable information, the player can feel a sense of accomplishment, a sense of power, etc., whereby the fun is improved, and also discloses a technique for displaying an icon of a "favorite character" selected by the user, on a play screen.

CITATION LIST

Patent Literature

{Patent Literature 1} Japanese Unexamined Patent Application, Publication No. 2018-99362

SUMMARY OF INVENTION

Technical Problem

Today, in many games for smartphones, a character's utterance function is installed as one technique for further making the attractiveness of a character strongly appeal to users.

The utterance function is a function in which a character is displayed on the entire screen, and the screen is tapped, whereby the character gives a predetermined utterance. Since the screen is a touchscreen display in the case of a smartphone, this function can be relatively easily realized.

Furthermore, there are games that include a function for pseudo-dialog with a character, which is obtained by further evolving such an utterance function, and application programs that implement the function for pseudo-dialog with a character as main content.

However, in a method in which, when a displayed character is tapped, the character reacts thereto, a tapping operation metaphorically means physical contact with the character, and thus, the reaction of the character may be an inappropriate reaction that is offensive to public order and morals depending on the position tapped. Thus, implementation of active interaction (interaction: exchange, contact) with a character is not suitable from the perspective of public order and morals.

In particular, even though a special event to celebrate the birthday of a user is a great chance to provide appealing interaction to the user, it is now difficult to implement interaction performed through a tap operation, due to the above-mentioned reason.

Main screens of many games released in recent years have a character's utterance function in many cases, and, in order to make those main screens more attractive, realization of a function for performing healthy and active interaction with a character is required.

The present invention has been made in view of the above-described problem, and an object thereof is to provide a content playback program and a content playback device in which a character displayed on a display unit performs a predetermined reaction in response to a screenshot acquisition operation.

Solution to Problem

In order to solve the above-described problem, a content playback program according to the present invention is operated in a computer that realizes a content playback device having: a display unit on which a character is displayed; an operation unit; an operation-information processing unit that verifies whether operation information output from the operation unit is an instruction for screen capture processing for recording a screen displayed on the display unit in an image file; and a capture processing unit that is an OS standard program in the computer and that executes the screen capture processing on the basis of the instruction for the screen capture processing issued from the operation-information processing unit.

Then, the content playback program according to the present invention realizes: a capture detecting function that is a program for content playback different from the OS standard program and that detects that the capture processing unit, which is the OS standard program in the computer, has executed the screen capture processing; and a scenario processing function that is the program for content playback different from the OS standard program and that executes processing for displaying a first visual file, which stores a visual of a character in a first state, on the display unit before the capture detecting function detects that the capture processing unit has executed the screen capture processing and for displaying a second visual file, which stores a visual of the character in a second state different in display mode from the first state, on the display unit in response to the fact that the capture detecting function, which is the program for content playback different from the OS standard program, detects that the capture processing unit has executed the screen capture processing.

Advantageous Effects of Invention

According to the present invention, it is possible that a character displayed on a display unit performs a predetermined reaction in response to a screenshot acquisition operation.

Problems, configurations, and effects other than those described above will be apparent from the following description of an embodiment.

BRIEF DESCRIPTION OF DRAWINGS

FIG. 4 is a view showing examples of field compositions and records in various tables.

FIGS. 9A, 9B, 9C and 9D are views showing image-file variations before and after execution of the screenshot.

FIG. 10 is a view showing examples of field compositions and records in various tables in a content playback device according to a first modification of the present invention.

FIG. 11 is a view showing examples of field compositions and records in various tables in a content playback device according to a second modification of the present invention.

DESCRIPTION OF EMBODIMENT

[Content Playback Device 101]

Figure 1:
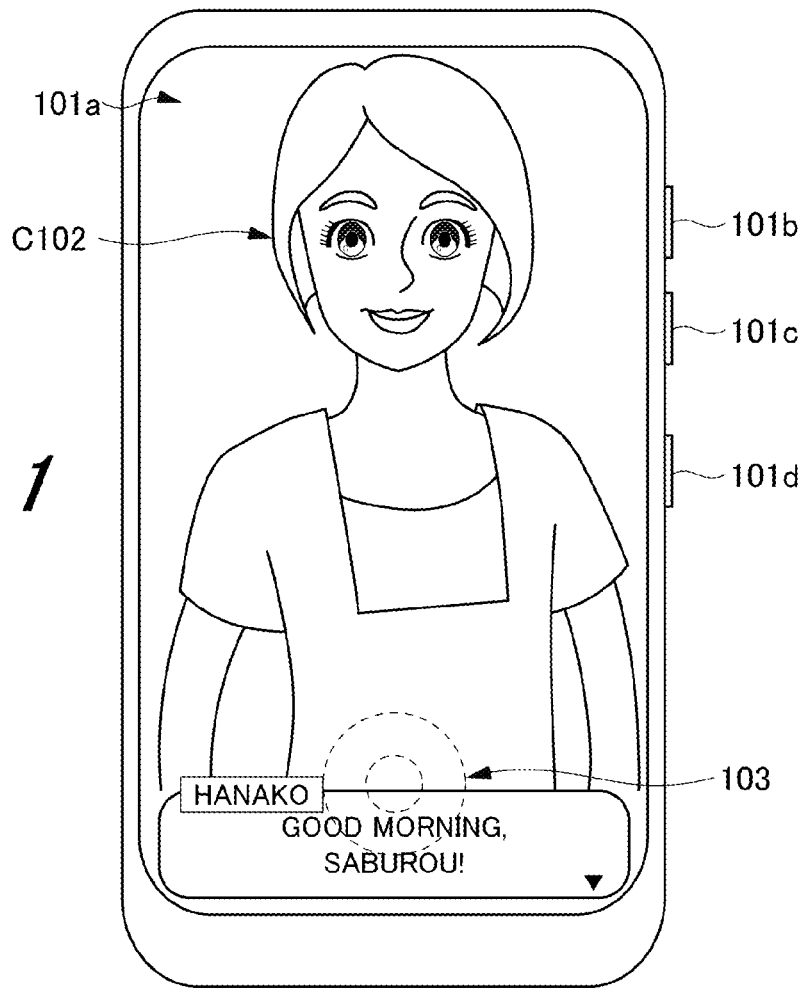
FIG. 1 is a view showing the overall configuration of a content playback device according to an embodiment of the present invention.

FIG. 1 is a view showing the overall configuration of a content playback device 101 according to an embodiment of the present invention.

A smartphone reads a game program and functions as a content playback device 101. A user operates a touchscreen display 101a of the content playback device 101 to play a game.

Three push-button switches, i.e., a volume up switch 101b, a volume down switch 101c, and a power switch 101d, are provided on one side of the content playback device 101.

The content playback device 101 according to the embodiment of the present invention is a game in which a single or a plurality of characters C102 appear. Note that it is conceivable that only a single character appears when the game program is a love simulation game, a mascot application, or the like.

Furthermore, when the game program is executed, the content playback device 101 emits sound, such as audio and music in the game content, by means of a built-in speaker 103.

Note that, although the content playback device 101 according to the embodiment of the present invention, to be described below, will be explained in terms of a smartphone that executes a stand-alone type game program, it is also possible to use a smartphone, a dedicated game machine, a personal computer, or the like that executes Internet games for which communication is performed with a game server.

Figure 2:
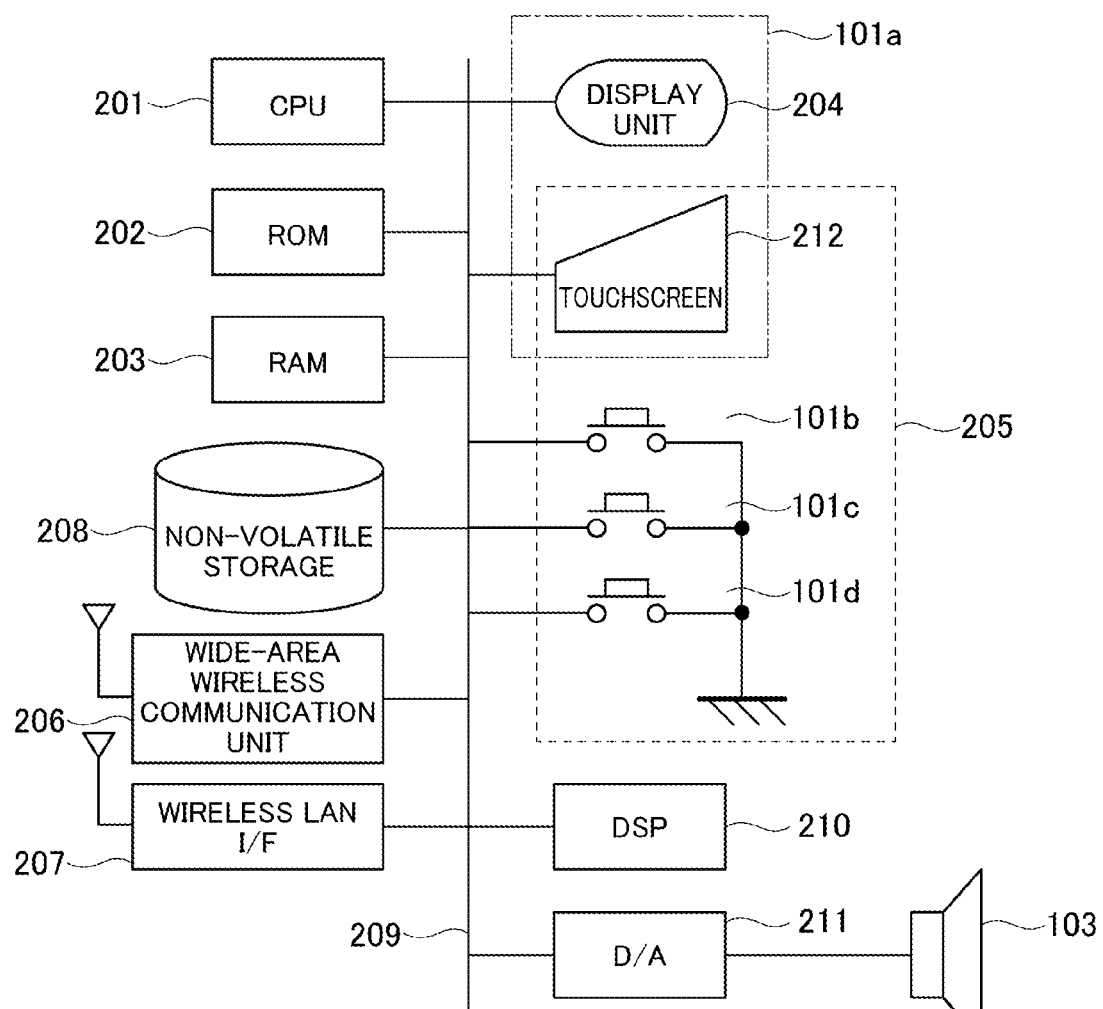
FIG. 2 is a block diagram showing the hardware configuration of the content playback device (smartphone).

FIG. 2 is a block diagram showing the hardware configuration of the content playback device 101 (smartphone).

The content playback device 101, which is a well-known computer, includes a CPU 201, a ROM 202, a RAM 203, a display unit 204, a wide-area wireless communication unit 206, a wireless LAN interface 207, a non-volatile storage 208, a DSP 210, and a D/A converter 211 that are connected to a bus 209. The display unit 204 is configured of an LCD or the like. Furthermore, the built-in speaker 103 is connected to the DSP 210.

Note that an operation unit 205 is an assembly of an electrostatic-type touchscreen 212, the volume up switch 101b, the volume down switch 101c, and the power switch 101d. The reason why the push-button switches are shown inside the operation unit 205 is because a screenshot acquisition operation, to be described later, is performed by simultaneously pushing the volume up switch 101b and the power switch 101d in the case of iOS (registered trademark) and by simultaneously pushing the volume down switch 101c and the power switch 101d in many cases of Android (registered trademark).

Figure 3:
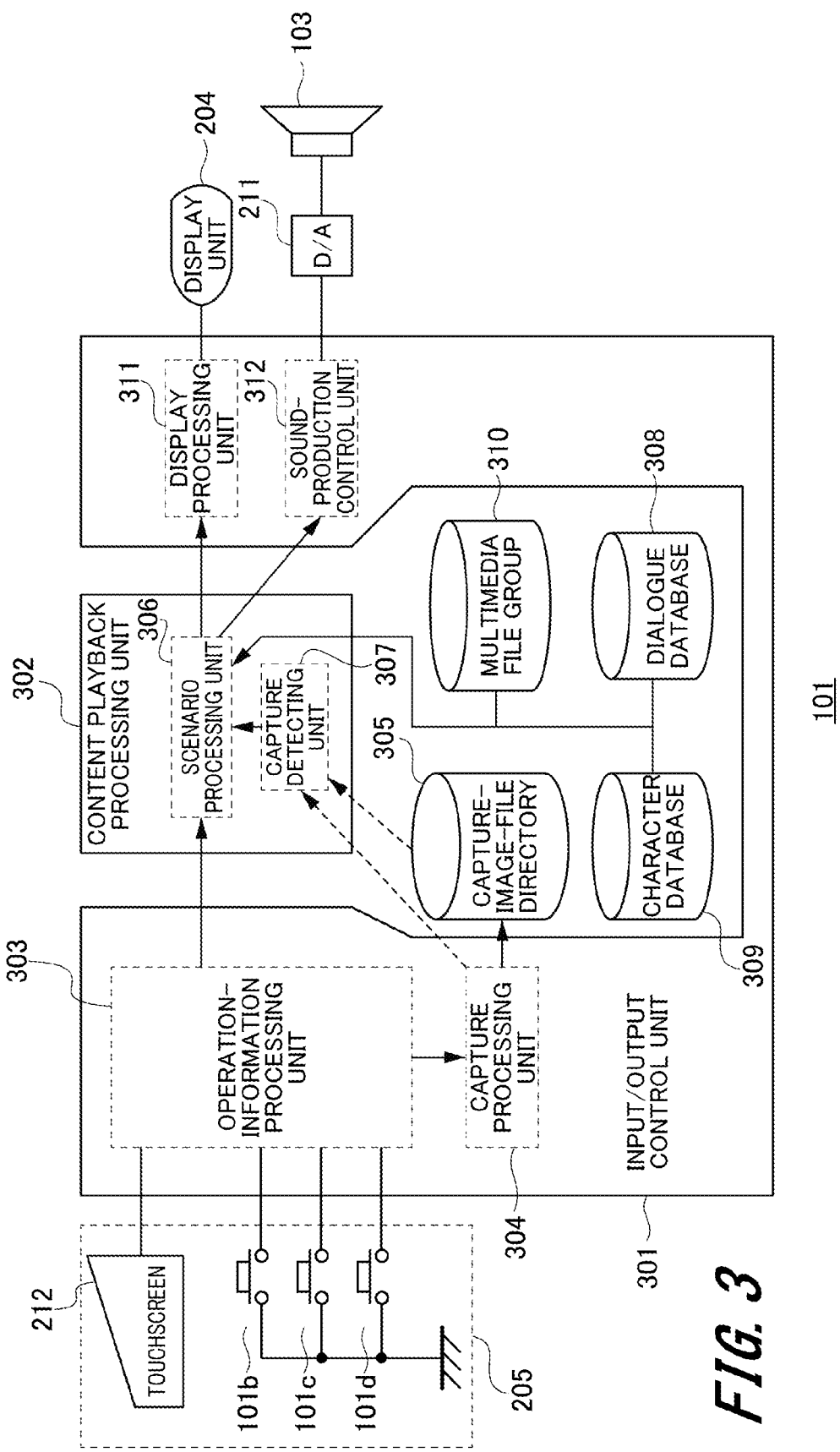
FIG. 3 is a block diagram showing software functions of the content playback device.

FIG. 3 is a block diagram showing software functions of the content playback device 101.

An input/output control unit 301 that serves as an OS interprets operation information input via the operation unit 205 and passes the operation information to a content playback processing unit 302 as needed.

The input/output control unit 301 includes an operation-information processing unit 303 and a capture processing unit 304.

The operation-information processing unit 303 provides an operation-information processing function for distinguishing whether operation information input from the electrostatic-type touchscreen 212 and the push-button switches, i.e., the volume up switch 101b, the volume down switch 101c, and the power switch 101d, is operation information that should be passed to the content playback processing unit 302 or operation information that should be processed inside the input/output control unit 301.

If the operation information is operation information that instructs the execution of a screenshot, the operation-information processing unit 303 judges that the operation information should be processed inside the input/output control unit 301 and activates the capture processing unit 304.

The capture processing unit 304 provides a capture processing function for converting a screen currently displayed on the display unit 204 into a capture file that is an image file and for storing the capture file in a capture-image-file directory 305. Specifically, a screen capture processing function of the capture processing unit 304 is a standard feature implemented in the OS.

The content playback processing unit 302 is the body of the game program.

The content playback processing unit 302 includes a scenario processing unit 306 and a capture detecting unit 307.

The scenario processing unit 306 provides a scenario processing function for executing a scenario corresponding to an event or predetermined operation information with respect to a predetermined character. In one example, a scenario is described in a script and is stored in a dialogue database 308. The script is, for example, an interpreter-based programming language, a unique script language, JSON, XML, CSV, a tagged natural language, or the like.

In a scenario, in addition to information about a character stored in the character database 309, a display instruction for a still image file of this character, or a playback instruction for a moving-image file, an audio file, etc. of this character, these files being stored in a multimedia file group 310, is described.

Note that an example format of a still image file can be a bitmap image, 3D model data (vector data), or a mixture of a bitmap image and 3D model data but is not necessarily limited thereto.

The capture detecting unit 307 provides a capture detecting function for detecting that the capture processing unit 304 has executed a screen capture.

For example, in the case of iOS (registered trademark), the capture detecting unit 307 detects an event "UIApplicationUserDidTakeScreenshot" that is globally notified from the OS, i.e., the input/output control unit 301.

Furthermore, in the case of Android (registered trademark), the capture detecting unit 307 monitors the capture-image-file directory 305 and detects that a new file has been created in the capture-image-file directory 305, thus detecting execution of a screen capture in the capture processing unit 304. Note that the capture-image-file directory 305 includes, for example, "/storage/emulated/0/Pictures/Screenshots" or the like.

The scenario processing unit 306 reads out a specified still image file or the like from the multimedia file group 310 on the basis of the description of a scenario and generates screen information related to a character or the like. The screen information generated at the scenario processing unit 306 is sent to a display processing unit 311 in the input/output control unit 301 and is displayed on the display unit 204.

Furthermore, the scenario processing unit 306 instructs a sound-production control unit 312 to read a specified sound file or moving-image file from the multimedia file group 310 on the basis of the described scenario.

The sound-production control unit 312 is sound middleware, and, after reading a definition file (not shown) specified by the content playback processing unit 302, reads out a sound file or a moving-image file related to the character stored in the multimedia file group 310 according to the instruction issued by the scenario processing unit 306.

Then, the sound-production control unit 312 executes decoding and playback processing for the read-out sound file or moving-image file and equalizing processing with respect to sound stream data. Those processing procedures are realized by utilizing computational resources of the CPU 201 and the DSP 210, which are shown in FIG. 2.

The sound-production control unit 312 generates integrated sound stream data as a result of those arithmetic processing procedures. Specifically, the integrated sound stream data is, for example, sound stream data having a form in which the character speaks predetermined lines with BGM playing.

The integrated sound stream data is sent to the D/A converter 211. The D/A converter 211 converts the integrated sound stream data into an analog signal and drives the built-in speaker 103.

FIG. 4 is a view showing examples of field compositions and records in various tables.

The character database 309 read by the content playback processing unit 302 includes a character master 401.

The character master 401 has a character-ID field and a character-name field.

The character-ID field stores a character ID that uniquely identifies a character.

The character-name field stores a character name.

Note that, in the case of an application program in which only a single character appears, the character master 401 is not required, and character-ID fields in a character status table 1002 and a scenario table 404, to be described later, are not required.

Note that, particularly in online games, there are cases in which characters with an identical name are given different appearances and different levels of performance and are separately provided by being labeled with "xx version" or the like. Therefore, in the case where characters with an identical name are provided in different styles, it is also possible to give different character IDs in order to distinguish those different styles.

The dialogue database 308 read by the content playback processing unit 302 includes an event table 403 and the scenario table 404.

The scenario table 404 has a character-ID field, an event-type field, and a display-script field.

The character-ID field is the same as that in the character master 401.

The event-type field stores ID information of an event type that can execute a script stored in the display-script field.

The display-script field stores a script for actually displaying content.

Specifically, in the display-script field, execution instructions in scripts are listed, such as an instruction to display an image file of a predetermined character, an instruction to display an image file of a predetermined background, an instruction to display an image file for changing a facial expression of the predetermined character, an instruction to display an image file of a speech bubble for displaying lines of the predetermined character, and an instruction to display a sentence corresponding to the lines of the predetermined character, in the image file of the speech bubble.

The event table 403 has an event-type field and a condition-script field.

The event-type field is the same as that in the scenario table 404.

The condition-script field stores a script for determining a predetermined condition, for each event type in the event-type field.

For example, in the case of an event type "greeting for weekday mornings" in the event-type field, when the time at which the content playback processing unit 302 (game-program body) is activated is between 5:00 and 9:00 am, and the content playback processing unit 302 is activated for the first time between 5:00 and 9:00 am, a condition stored in the conditional script corresponding to the event type "greeting for weekday mornings" is satisfied.

Furthermore, in the case of an event type "screenshot" in the event-type field, when the capture detecting unit 307 detects that the screenshot has been executed, a condition stored in the condition-script field and corresponding to the event type "screenshot" in the event-type field is satisfied.

Figure 5:
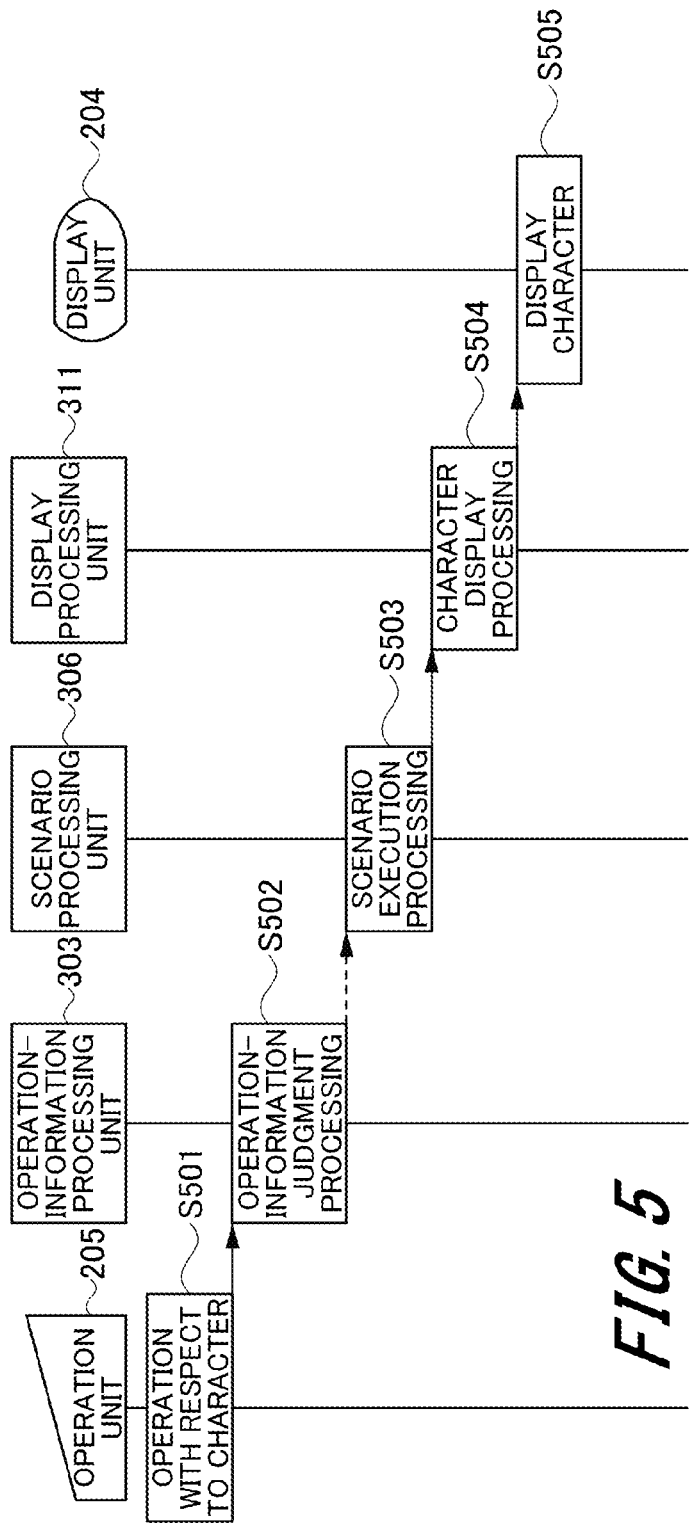
FIG. 5 is a timing chart showing character display with respect to a normal event.

FIG. 5 is a timing chart showing character display with respect to a normal event.

In the case where the user performs an operation with respect to a character through the operation unit 205 (S501), the operation-information processing unit 303 judges that corresponding operation information is operation information that should be passed to the content playback processing unit 302 (S502). Then, this operation information is passed to the scenario processing unit 306 in the content playback processing unit 302, whereby an event occurs in the scenario processing unit 306. An example of the operation with respect to a character includes, for example, an operation for having a conversation with the character.

Furthermore, in the case where the scenario processing unit 306 independently judges that a predetermined condition has been satisfied, an event occurs without operation information.

When the scenario processing unit 306 recognizes the occurrence of the event, the scenario processing unit 306 executes a predetermined display scenario corresponding to the event and, as a result, outputs data related to the content to the display processing unit 311 (S503). The display processing unit 311 generates display data on the basis of the received data (S504) and displays the display data on the display unit 204 (S505).

Figure 6:
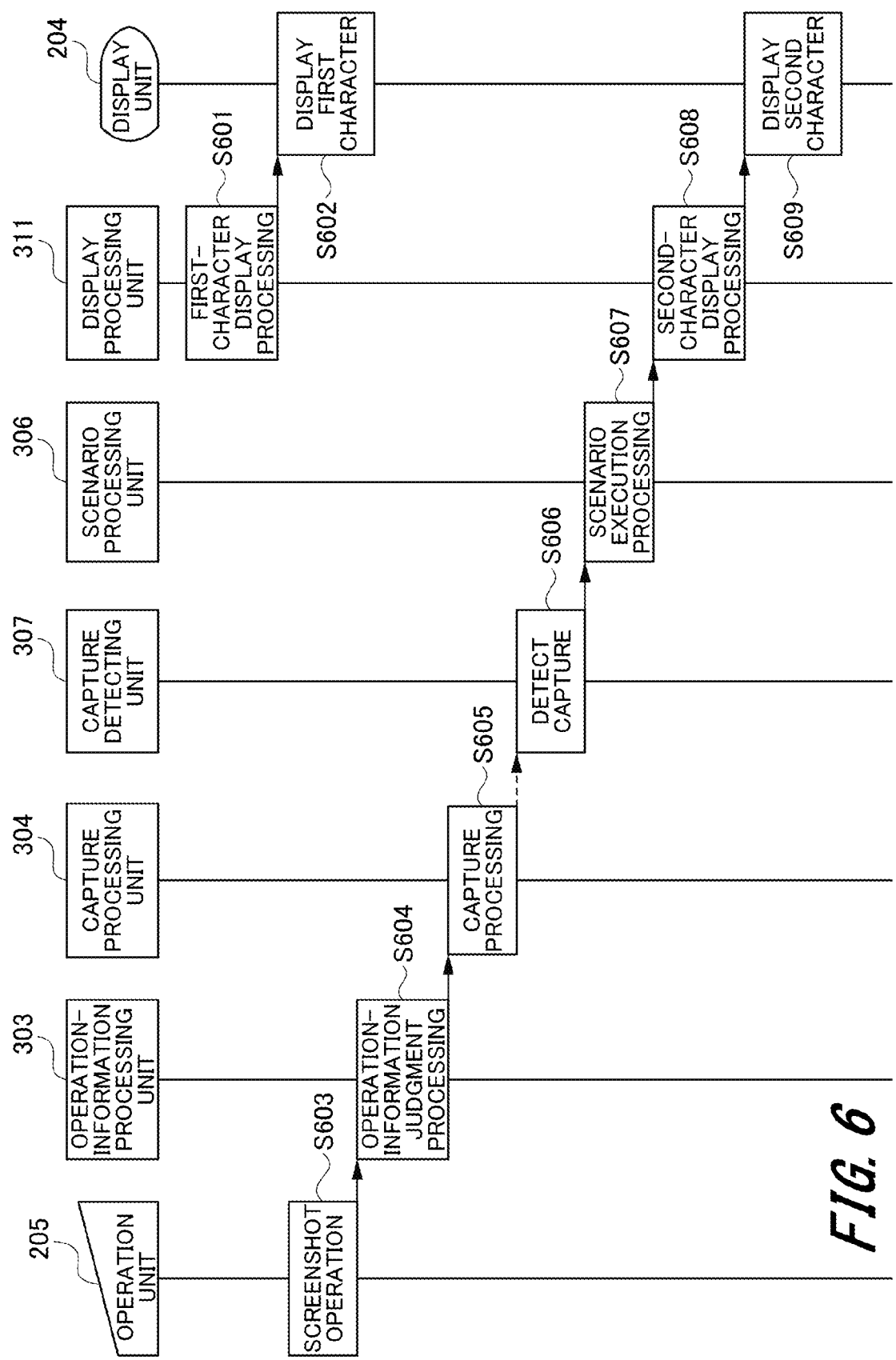
FIG. 6 is a timing chart showing character display with respect to a screenshot event.

FIG. 6 is a timing chart showing character display with respect to a screenshot event.

First, as a result of activation processing of the content playback processing unit 302 and execution of a predetermined scenario, the display processing unit 311 generates display data related to a first character (S601) and displays the display data on the display unit 204 (S602).

In a state in which the first character is displayed on the display unit 204 (S602), when the user performs a screenshot operation through the operation unit 205 (S603), the operation-information processing unit 303 interprets that this operation information is a screenshot execution instruction and instructs the capture processing unit 304 to execute the screenshot (S604). Then, the capture processing unit 304 executes capture processing for storing the screenshot (S605).

When the capture processing unit 304 executes the capture processing, the capture detecting unit 307 detects this execution and makes a report to the scenario processing unit 306 (S606).

When the scenario processing unit 306 recognizes the occurrence of the screenshot event, the scenario processing unit 306 executes a scenario corresponding to this event and outputs data related to a second character to the display processing unit 311 (S607).

The display processing unit 311 generates display data related to the second character on the basis of the data related to the second character received from the scenario processing unit 306 (S608) and displays the display data on the display unit 204 (S609).

In Step S607, the scenario processing unit 306 obtains the character ID of the character displayed on the display unit 204.

Next, in response to the fact that the occurrence of the screenshot event has been recognized, the scenario processing unit 306 obtains the event type of the conditional script for the obtained character ID, from the condition-script field of the event table 403. Then, the scenario processing unit 306 searches the scenario table 404 by the character ID and the event type and executes the display script in the hit record.

As a result of this, display data related to the second character is displayed on the display unit 204.

Figure 7:
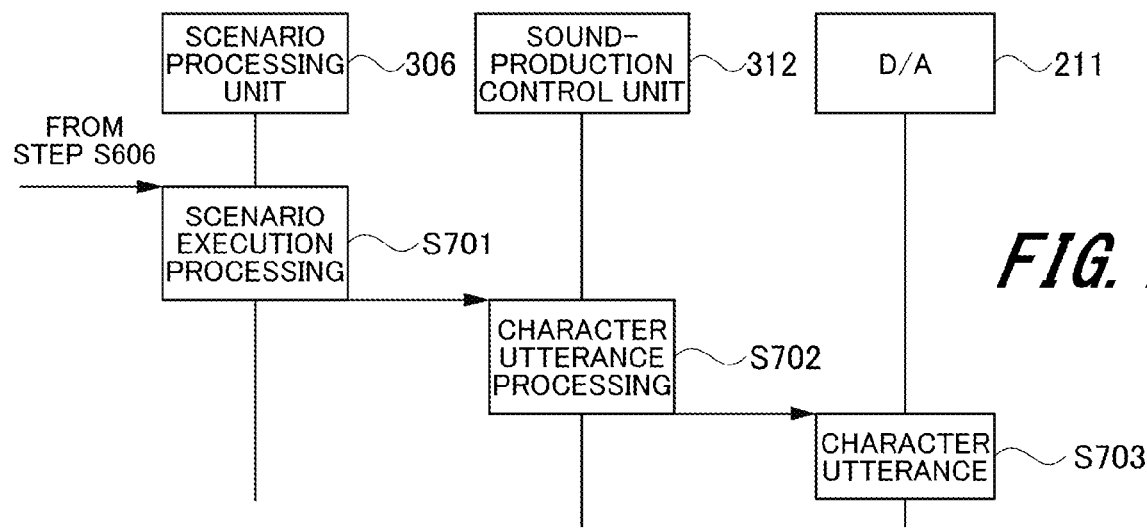
FIG. 7 is a timing chart showing sound-file playback with respect to an event in the screenshot.

FIG. 7 is a timing chart showing sound-file playback with respect to the event in the screenshot. The timing chart is continued from Step S606 of FIG. 6.

When the scenario processing unit 306 recognizes the occurrence of the screenshot event, the scenario processing unit 306 executes the scenario corresponding thereto and instructs the sound-production control unit 312 to playback a sound file related to an utterance of the character (S701).

The sound-production control unit 312 reads the sound file from the multimedia file group 310 according to the playback instruction of the sound file related to an utterance of the character, received from the scenario processing unit 306. Then, the sound-production control unit 312 performs decoding processing on the read sound file, generates integrated sound stream data, and sends the integrated sound stream data to the D/A converter 211 (S702).

When the integrated sound stream data is received, the D/A converter 211 generates an analog audio signal and drives the speaker. Accordingly, a production in which the character displayed on the display unit 204 gives an utterance is realized (S703).

As shown in FIG. 6, immediately after execution of the screenshot, the scenario processing unit 306 performs an operation for displaying the character in a state different from the state immediately before the execution of the screenshot. Furthermore, as shown in FIG. 7, the scenario processing unit 306 performs an operation for making a predetermined sound, immediately after execution of the screenshot.

In this way, it is preferable that the operation for displaying the character in a state different from the state immediately before the execution of the screenshot and the operation for making a predetermined sound immediately after the execution of the screenshot be performed at the same time in terms of producing the character.

Figure 8B:
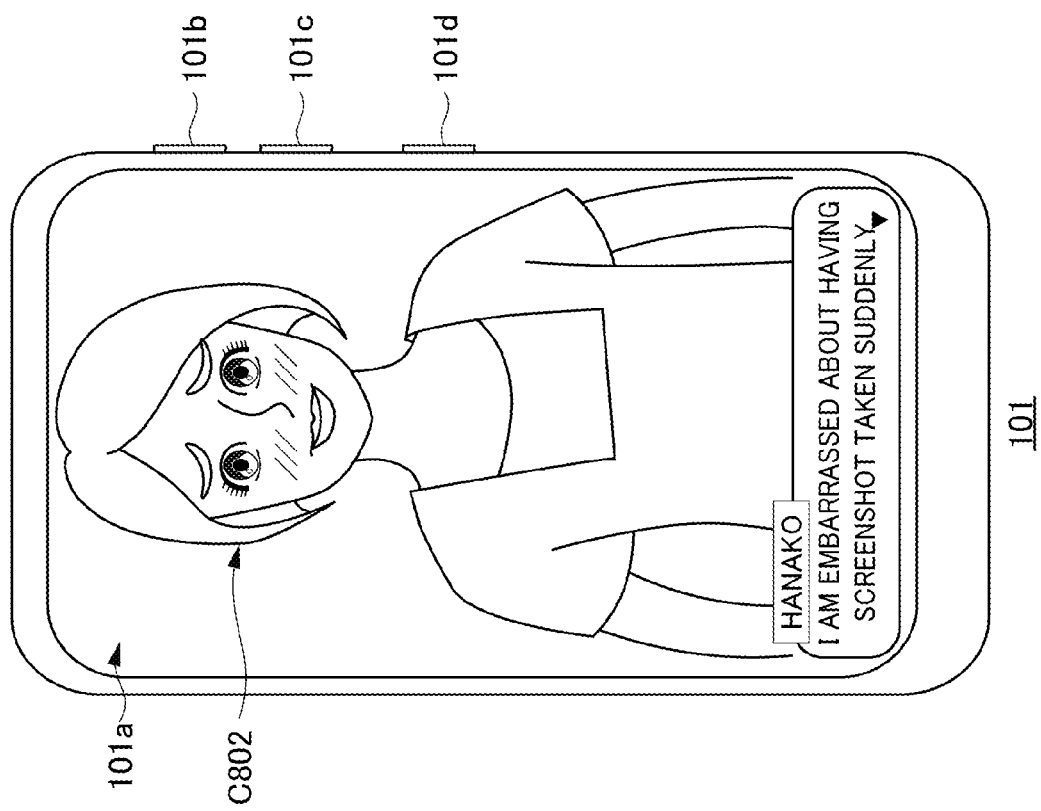
FIGS. 8A and 8B shows examples of screens before and after execution of the screenshot.
Figure 8A:
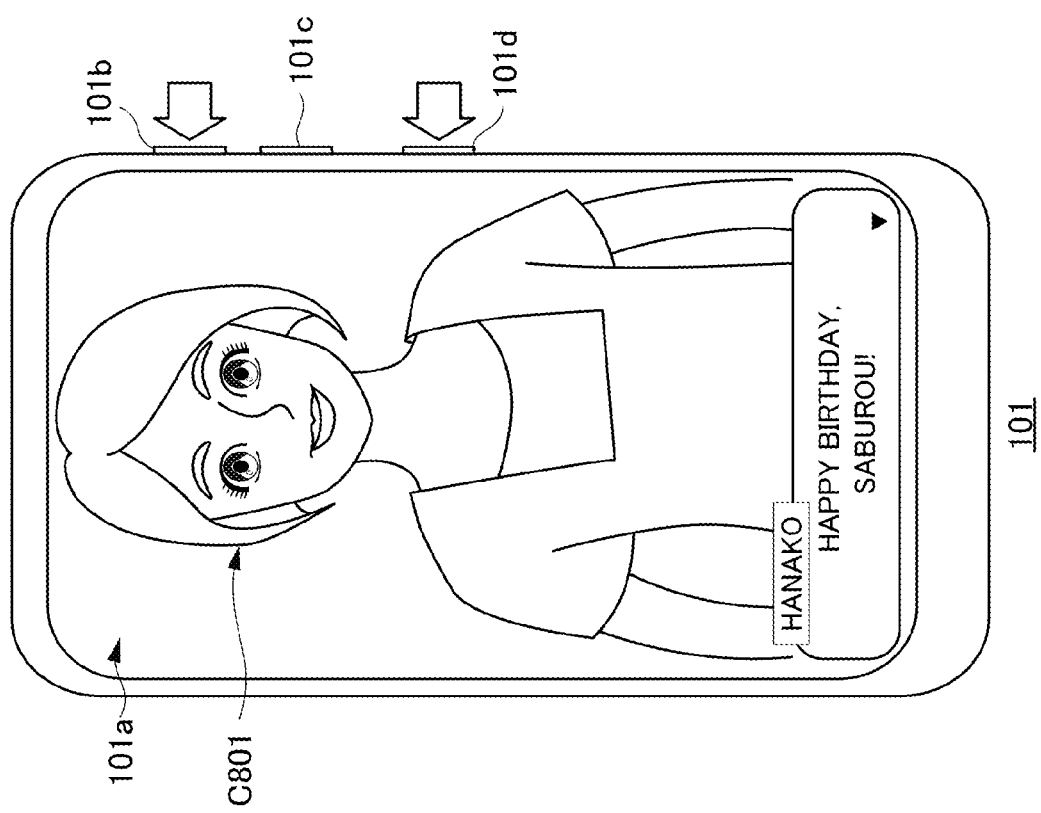

FIG. 8A shows an example of a screen before execution of a screenshot.

FIG. 8B shows an example of a screen immediately after execution of the screenshot.

As shown in FIG. 8A, before execution of the screenshot, a character C801 in a first state is displayed on the touchscreen display 101a.

In this state, the user, who is operating the device, simultaneously pushes the volume up switch 101b and the power switch 101d, for example. Through this button operation, the screenshot, which is a standard feature of the OS, is executed.

Immediately after execution of the screenshot, as shown in FIG. 8B, a character C802 in a second state that is different in display mode from the first state is displayed on the touchscreen display 101a.

Note that, as for the screenshot itself, the entire screen with the character C801 in the first state, shown in FIG. 8A, being displayed therein is generated as a capture image file and is stored in the capture-image-file directory 305.

FIG. 9A is a view showing a portion of an image of the character before execution of the screenshot.

FIG. 9B is a view showing a portion of an image of the character immediately after execution of the screenshot.

FIG. 9C is a view showing image data that composes the image of the character before execution of the screenshot.

FIG. 9D is a view showing image data that composes the image of the character immediately after execution of the screenshot.

FIGS. 9A to 9D are views for explaining actual forms of the image data of the character in the first state and the character in the second state, which are shown in FIGS. 8A-8B, before and after execution of the screenshot.

A face part C901, which is a portion of the image of the character before execution of the screenshot and which is shown in FIG. 9A, is configured when an eyebrow part C904 that is a transparent image file is superimposed on a common face base part C903 that is shown in FIG. 9C, and these parts are displayed on the touchscreen display 101a.

Furthermore, a face part C902, which is a portion of the image of the character immediately after execution of the screenshot and which is shown in FIG. 9B, is configured when an eyebrow part C905 that is a transparent image file is superimposed on the common face base part C903 that is shown in FIG. 9D, and these parts are displayed on the touchscreen display 101a.

In general, well-known novel games etc. use a technique for performing display by superimposing a transparent image file of only face parts, such as eyes and a mouth, on an image file of an outline etc. of the face of a character. In the content playback device 101 according to the embodiment of the present invention, similar processing is applied.

In that case, as shown in FIGS. 9A-9D, each of the image files that realize the character in the first state and the character in the second state is not a single file.

Therefore, each of "a first image file that records a visual in a first state" and "a second image file that records a visual in a second state different from the first state" is not limited to a single image file.

Furthermore, a visual to be displayed is not limited to a still image file and can be a moving-image file as a matter of course. Thus, a still image file and a moving-image file are collectively referred to as "visual files" and are defined as "a first visual file that records a visual in the first state" and "a second visual file that records a visual in the second state different from the first state".

Note that the save destination of the first and second visual files is not limited to a local non-volatile storage because it is assumed that moving-image files of birthday messages etc. are stored in a game server.

[First Modification: Content Playback Device 101]

When the content playback processing unit 302 detects execution of a screenshot caused by a user's operation in a state in which a character is displayed on the display unit 204, the content playback device 101 of the above-described embodiment executes a production in which a facial expression of the character changes and/or the character speaks, etc., immediately after completion of the screenshot. That is, the screenshot serves as a trigger for a production of the character in the content playback device 101.

Depending on the types of games, there are cases where parameters corresponding to "levels" are given to characters as attribute information.

For example, in a game having a battle element, characters have parameters such as "offensive power", "defensive power", "battle power", etc. Furthermore, in a game having a pseudo-romance element, characters have parameters such as "intimacy" etc.

Many games are configured such that users raise characters through operations, such as execution of events in the games, to increase the levels thereof. Such repeated operations in battles etc. for increasing level values and status values in games are called "self-imposed challenge".

The content playback device 101 can make the content of a production of the character different in accordance with the level value given as attribute information of the character. When the game (the content playback device 101) is configured such that the user increases the level of a character to make it possible to view a more luxurious production, this contributes to an improvement in maintaining the user's motivation for continuing to play the game.

A content playback device 101, to be described below, according to a first modification of the present invention has the same functional block as the content playback device 101 that has been described above, and realizes functional expansion by changing only data.

FIG. 10 is a view showing examples of field compositions and records in various tables in the content playback device 101 according to the first modification of the present invention.

The examples of the field compositions and the records in the various tables shown in FIG. 10 differ from those shown in FIG. 4 in that a character status table 1002 is added.

The character database 309 read by the content playback processing unit 302 includes the character master 401 and the character status table 1002.

The character status table 1002 has a character-ID field and a level field.

The character-ID field is the same as that of the character master 401.

The level field stores a level value of the corresponding character, the level value being set in accordance with user's game-progress status. This level value is various in games; for example, the strength of a character is stored as a level value in the case of a battle action game, and the level of intimacy with a character is stored as a level value in the case of a mascot application.

Note that, instead of the level field or as a field coexisting with the level field, it is also possible to provide a field that stores flag information or parameter information indicating the progress of a scenario, the item acquisition status, etc.

In the display-script field of the scenario table 404, execution instructions in scripts are listed in accordance with the values in the level field of the character status table 1002, such as an instruction to display an image file of a predetermined character, an instruction to display an image file of a predetermined background, an instruction to display an image file for changing a facial expression of the predetermined character, an instruction to display an image file of a speech bubble for displaying lines of the predetermined character, an instruction to display a sentence corresponding to the lines of the predetermined character, in the image file of the speech bubble, and an instruction to playback an audio file corresponding to the lines of the predetermined character described in the image file of the speech bubble.

The display script describes the following processing procedures executed by the scenario processing unit 306. The scenario processing unit 306 executes a display script, thus executing the following processing procedures.

(1) In order to obtain the level of a character currently displayed on the display unit 204, the scenario processing unit 306 searches the character status table 1002 by the character ID and reads the value in the level field of the hit record.

(2) Next, the scenario processing unit 306 executes processing in accordance with the obtained level of the character. Specifically, the scenario processing unit 306 executes, on the display unit 204, display of an image file of the character, display of an image file of a predetermined background, display of an image file for changing a facial expression of the character, display of an image file of a speech bubble for displaying lines of the character, display of a sentence corresponding to the lines of the predetermined character, in the image file of the speech bubble, playback of an audio file corresponding to the lines of the character described in the image file of the speech bubble, etc.

Specifically, the display script describes: a condition branch instruction for confirming the level of the character; and a plurality of types of character production instructions in accordance with the level of the character.

In one example, in FIG. 10, levels "1" and "2" are described in the character status table 1002.

For example, since user's self-imposed challenge is low with respect to a character having a level "1", a character production described in the display script and realized is configured of a reaction based on the assumption that the level of intimacy with the user is low. In a production with respect to screenshot in the present invention, an expression in which the character gets a little angry at the user, for example, is used.

In contrast to this, regarding a character having a level "2", the level of the character reaches "2" as a result of the fact that the user has done self-imposed challenge in the game. Thus, a character production to be realized by being described in a display script is configured of a reaction based on the assumption that the level of intimacy with the user is high. In a production with respect to screenshot in the present invention, an expression in which the character is shy against the user, for example, is used.

In the above-described first modification, although a single numerical value of "level value" has been illustrated, the parameter to be given to a character is not limited thereto. As illustrated above, various types of parameters, such as "offensive power", "defensive power", "battle power", and "intimacy", are provided in accordance with the form of a game. Therefore, it is possible to configure condition judgment by combining those plurality of parameter values with an AND condition, an OR condition, or the like.

Since a timing chart for character display with respect to an event in the normal state in the content playback device 101 according to the first modification of the present invention is exactly the same as that shown in FIG. 5, a detailed description thereof will be omitted.

Since a timing chart for character display with respect to an event in the screenshot in the content playback device 101 according to the first modification of the present invention is almost the same as that shown in FIG. 6, a detailed description thereof will be omitted. However, the difference in operation in Step S607 will be described below.

In Step S607 of FIG. 6, the scenario processing unit 306 searches the character status table 402 by the character ID of the character displayed on the display unit 204 and obtains the level value of the character.

Next, the scenario processing unit 306 executes a conditional script described in the condition-script field of the event table 403 and recognizes the occurrence of the screenshot event. Then, the scenario processing unit 306 executes a display script registered in the display-script field of a record in which the value in the event-type field of the scenario table 404 is "screenshot".

A condition judgment instruction is described in the display script, and the scenario processing unit 306 executes a production of the character corresponding to the earlier obtained level value of the character, according to the condition judgment instruction. Specifically, the scenario processing unit 306 executes an instruction to display a specified image file on the display unit 204.

As a result, display data related to the second character corresponding to the level value of the character is displayed on the display unit 204.

Since a timing chart for sound-file playback with respect to an event in the screenshot, in the content playback device 101 according to the first modification of the present invention, is almost the same as that shown in FIG. 7, a detailed description thereof will be omitted. However, the difference in operation in Step S701 will be described below.

In Step S701 of FIG. 7, the scenario processing unit 306 searches the character status table 402 by the character ID of the character displayed on the display unit 204 and obtains the level value of the character.

Next, the scenario processing unit 306 executes a conditional script described in the condition-script field of the event table 403 and recognizes the occurrence of the screenshot event. Then, the scenario processing unit 306 executes a display script registered in the display-script field of a record in which the value in the event-type field of the scenario table 404 is "screenshot".

A condition judgment instruction is described in the display script, and the scenario processing unit 306 executes a production of the character corresponding to the earlier obtained level value of the character, according to the condition judgment instruction. Specifically, the scenario processing unit 306 executes an instruction to playback a specified audio file.

As a result, a predetermined sound corresponding to the level value of the character is played back from the built-in speaker 103 or the like.

Note that, in FIGS. 6 and 7, although a description has been given of how the character display form and the utterance form immediately after the screenshot change on the basis of the level value of each character set in the character status table 402 shown in FIG. 4, it is also possible to use a single value that indicates the overall game-progress status etc. In that case, instead of setting the level value different for each character, a character display form and an utterance form immediately after the screenshot that are based on a common value to all characters are set.

Specifically, the scenario processing unit 306 determines the content to be output through the display function and/or the audio playback function immediately after the screenshot, in accordance with the level value indicating the progress status in the game.

The content playback device 101 according to the first modification of the present invention has no changes in the functional block, including the scenario processing unit 306. The character status table 1002, which records status information of each character, is provided, and a function is just added to a display script registered in the display-script field of the scenario table 404, whereby the content playback device 101 can make a production of the character after detection of the screenshot, different in accordance with the status information of the character.

[Second Modification: Content Playback Device 101]

The content playback device 101 according to the above-described first modification provides the character status table 1002, which records the status value of each character, and describes, in a display script, a conditional branch based on the status value of the character and a character production different for each branch, thereby realizing a different character production according to status information of the character.

The place in which a conditional branch based on the status value of the character is provided is not limited to the display script. It is also possible to describe a conditional branch in a conditional script described in the condition-script field of the event table.

FIG. 11 is a view showing examples of field compositions and records in various tables in a content playback device 101 according to a second modification of the present invention.

The examples of the field compositions and the records in the various tables shown in FIG. 11 differ from those shown in FIG. 10 in that an event table 1103 that has a different record configuration from that of the event table 403, which is shown in FIG. 10, and a scenario table 1104 that has a different record configuration from that of the scenario table 404, which is shown in FIG. 10, are provided.

In FIG. 11, the event table 1103 has, in the event-type field, records having events of types of "birthday Lv1" and "birthday Lv2". These records indicate that the condition in the conditional script described or registered in the condition-script field of the event table 1103 changes depending on whether the corresponding level value stored in the level field of the character status table 1002 is "1" or "2".

Specifically, it is indicated that the conditional script described or registered in the condition-script field of the record having "birthday Lv1" in the event-type field of the event table 1103 satisfies the following conditions.

First, the level value for a certain character ID of a character in the character status table 1002 is "1".

And, in the case where it is the birthday of the user when the content playback processing unit 302, which is the main body of the game program, is activated, the condition described in the conditional script is satisfied.

On the other hand, it is indicated that the conditional script described or registered in the condition-script field of the record having "birthday Lv2" in the event-type field of the event table 1103 satisfies the following conditions.

First, the level value for a certain character ID of a character in the character status table 1002 is "2".

And, in the case where it is the birthday of the user when the content playback processing unit 302, which is the main body of the game program, is activated, the condition described in this conditional script is satisfied.

Furthermore, in FIG. 11, the event table 1103 has events of types of "screenshot Lv1" and "screenshot Lv2" provided in the event-type field.

It is indicated that the conditional script described or registered in the condition-script field of the record having "screenshot Lv1" in the event-type field of the event table 1103 satisfies the following conditions.

First, the level value for a certain character ID of a character in the character status table 1002 is "1".

And, in the case where the user executes the screenshot, the condition described in this conditional script is satisfied.

On the other hand, it is indicated that the conditional script described or registered in the condition-script field of the record having "screenshot Lv2" in the event-type field of the event table 1103 satisfies the following conditions.

First, the level value for a certain character ID of a character in the character status table 1002 is "2".

And, in the case where the user executes the screenshot, the condition described in this conditional script is satisfied.

Since a timing chart for character display with respect to an event in the normal state, in the content playback device 101 according to the second modification of the present invention, is exactly the same as that shown in FIG. 5, as in the content playback device 101 according to the first modification of the present invention, a detailed description thereof will be omitted.

Since a timing chart for character display with respect to an event in the screenshot, in the content playback device 101 according to the second modification of the present invention, is almost the same as that shown in FIG. 6, as in the content playback device 101 according to the first modification of the present invention, a detailed description thereof will be omitted. However, the difference in operation in Step S607 will be described below.

In Step S607 of FIG. 6, the scenario processing unit 306 searches the character status table 402 by the character ID of the character displayed on the display unit 204 and obtains the level value of the character.

Next, in response to the fact that the occurrence of the screenshot event is recognized, the scenario processing unit 306 obtains the event type of the conditional script corresponding to the obtained level value of the character, from the condition-script field of the event table 1103. Then, the scenario processing unit 306 searches the scenario table 1104 by the character ID and the event type, and executes the display script of the hit record.

As a result, display data related to the second character corresponding to the level value of the character is displayed on the display unit 204.

Since a timing chart for sound-file playback with respect to an event in the screenshot, in the content playback device 101 according to the second modification of the present invention, is almost the same as that shown in FIG. 7, as in the content playback device 101 according to the first modification of the present invention, a detailed description thereof will be omitted. However, the difference in operation in Step S701 will be described below.

In Step S701, the scenario processing unit 306 searches the character status table 402 by the character ID of the character displayed on the display unit 204 and obtains the level value of the character. Next, in response to the fact that the occurrence of the screenshot event is recognized, the scenario processing unit 306 obtains the event type of the conditional script corresponding to the obtained level value of the character, from the condition-script field of the event table 403. Then, the scenario processing unit 306 searches the scenario table 404 by the character ID and the event type, and executes the display script of the hit record.

As a result, a predetermined sound corresponding to the level value of the character is uttered from the speaker.

Note that, in FIGS. 6 and 7, although a description has been given of how the character display form and the utterance form immediately after the screenshot change on the basis of the level value of each character set in the character status table 402 shown in FIG. 4, it is also possible to use a single value that indicates the overall game-progress status etc. In that case, instead of setting the level value different for each character, a character display form and an utterance form immediately after the screenshot that are based on a common value to all characters are set.

Specifically, the scenario processing unit 306 determines the content to be output through the display function and/or the audio playback function immediately after the screenshot, in accordance with the level value indicating the progress status in the game.

The content playback device 101 according to the second modification of the present invention has no changes in the functional block, including the scenario processing unit 306, as in the content playback device 101 according to the first modification of the present invention. The character status table 1002, which records status information of each character, is provided, and a record corresponding to the status information of the character is merely added to the event table 1103 and the scenario table 1104, whereby the content playback device 101 can make a production of the character after detection of the screenshot, different in accordance with the status information of the character.

Furthermore, in the above-described embodiment and first and second modifications, it is also possible that the content playback device 101 not only performs a production of the character after detection of the screenshot but also changes the status, e.g., by increasing the level of the character.

According to the embodiment, the present invention discloses the content playback device 101 and the content playback program for realizing the same.

When execution of a screenshot caused by a user's operation is detected in a state in which a character is displayed on the display unit 204, the content playback processing unit 302 executes a production in which a facial expression of the character changes and/or a production in which the character speaks, immediately after completion of the screenshot. Accordingly, it is possible to further make the attractiveness of the character appeal to the user.

Although the embodiment of the present invention has been described above, the present invention is not limited to the above-described embodiment and encompasses other modifications and applications without departing from the gist of the present invention defined in claims.

REFERENCE SIGNS LIST 101 content playback device, 101a touchscreen display, 101b volume up switch, 101c volume down switch, 101d power switch, 103 built-in speaker, 201 CPU, 202 ROM, 203 RAM, 204 display unit, 205 operation unit, 206 wide-area wireless communication unit, 207 wireless LAN interface, 208 non-volatile storage, 209 bus, 210 DSP, 211 D/A converter, 212 electrostatic-type touchscreen, 301 input/output control unit, 302 content playback processing unit, 303 operation-information processing unit, 304 capture processing unit, 305 capture-image-file directory, 306 scenario processing unit, 307 capture detecting unit, 308 dialogue database, 309 character database, 310 multimedia file group, 311 display processing unit, 312 sound-production control unit, 401 character master, 402 character status table, 403 event table, 404 scenario table, 1002 character status table, 1103 event table, 1104 scenario table

The invention claimed is:

1. A content playback program causing a computer that is a content playback device having
a display unit on which a character is displayed,
an operation unit,
an operation-information processing unit that verifies whether operation information output from the operation unit is an instruction for screen capture processing for recording a screen displayed on the display unit in an image file, and
a capture processing unit that is an OS standard program in the computer and that executes the screen capture processing on the basis of the instruction for the screen capture processing issued from the operation-information processing unit,
to realize:
a capture detecting function that is a program for content playback different from the OS standard program and that detects that the capture processing unit, which is the OS standard program in the computer, has executed the screen capture processing; and
a scenario processing function that is the program for content playback different from the OS standard program and that executes processing for displaying a first visual file, which stores a visual of a character in a first state, on the display unit before the capture detecting function detects that the capture processing unit has executed the screen capture processing and for displaying a second visual file, which stores a visual of the character in a second state different in display mode from the first state, on the display unit in response to the fact that the capture detecting function, which is the program for content playback different from the OS standard program, detects that the capture processing unit has executed the screen capture processing.

2. A content playback program according to claim 1, wherein the scenario processing function further executes processing for playing back predetermined audio data in response to the fact that the capture detecting function, which is the program for content playback different from the OS standard program, detects that the capture processing unit, which is the OS standard program in the computer, has executed the screen capture processing.

3. A content playback program according to claim 1, wherein the scenario processing function includes a function of the program for content playback different from the OS standard program, for determining output content to be output through a display function and/or an audio playback function, which are/is an OS standard program(s) in the computer, immediately after execution of a screen capture processing function, which is an OS standard program in the computer, in accordance with a level value indicating the progress status in a game.

4. A content playback device comprising:
a display unit on which a character is displayed;
an operation unit;
an operation-information processing unit that verifies whether operation information output from the operation unit is an instruction for screen capture processing for recording a screen displayed on the display unit in an image file;
a capture processing unit that is an OS standard program in a computer and that executes the screen capture processing on the basis of the instruction for the screen capture processing issued from the operation-information processing unit;
a capture detecting unit that is a program for content playback different from the OS standard program and that detects that the capture processing unit, which is the OS standard program in the computer, has executed the screen capture processing; and
a scenario processing unit that is a program for content playback different from the OS standard program and that executes processing for displaying a first visual file, which stores a visual of a character in a first state, on the display unit before the capture detecting unit detects that the capture processing unit has executed the screen capture processing and for displaying a second visual file, which stores a visual of the character in a second state different in display mode from the first state, on the display unit in response to the fact that the capture detecting unit, which is the program for content playback different from the OS standard program, detects that the capture processing unit has executed the screen capture processing.

* * * * *